United States Patent
Voit et al.

(10) Patent No.: US 9,392,050 B2
(45) Date of Patent: Jul. 12, 2016

(54) AUTOMATIC CONFIGURATION OF EXTERNAL SERVICES BASED UPON NETWORK ACTIVITY

(71) Applicant: CISCO TECHNOLOGY, INC., San Jose, CA (US)

(72) Inventors: Eric A. Voit, Bethesda, MD (US); Richard M. Pruss, Queensland (AU); John E. McDowall, Redwood City, CA (US)

(73) Assignee: Cisco Technology, Inc., San Jose, CA (US)

( * ) Notice: Subject to any disclaimer, the term of this patent is extended or adjusted under 35 U.S.C. 154(b) by 289 days.

(21) Appl. No.: 13/842,394

(22) Filed: Mar. 15, 2013

(65) Prior Publication Data

US 2014/0280488 A1 Sep. 18, 2014

(51) Int. Cl.
*G06F 15/16* (2006.01)
*H04L 29/08* (2006.01)
*H04L 12/24* (2006.01)
*G06F 9/50* (2006.01)

(52) U.S. Cl.
CPC .............. *H04L 67/10* (2013.01); *G06F 9/5083* (2013.01); *H04L 41/0816* (2013.01); *H04L 41/5096* (2013.01); *G06F 2209/5022* (2013.01)

(58) Field of Classification Search
CPC ... H04L 47/122; H04L 41/0816; H04L 67/10; H04L 29/0818; H04L 41/0896; H04L 47/12; H04L 47/127; H04L 49/50; G06F 11/0709; G06F 2209/5022; G06F 9/5083
USPC .................................. 709/224, 223, 220, 203
See application file for complete search history.

(56) References Cited

U.S. PATENT DOCUMENTS

| | | | | |
|---|---|---|---|---|
| 8,867,361 B2* | 10/2014 | Kempf et al. | | 370/236 |
| 2013/0238785 A1* | 9/2013 | Hawk et al. | | 709/224 |
| 2013/0247034 A1* | 9/2013 | Messerli | | 718/1 |
| 2013/0265886 A1* | 10/2013 | Leong et al. | | 370/250 |
| 2013/0304903 A1* | 11/2013 | Mick et al. | | 709/224 |
| 2014/0003232 A1* | 1/2014 | Guichard et al. | | 370/230 |
| 2014/0059225 A1* | 2/2014 | Gasparakis et al. | | 709/226 |

(Continued)

FOREIGN PATENT DOCUMENTS

| | | | |
|---|---|---|---|
| WO | 2010099513 A2 | 9/2010 | |
| WO | WO 2012/130264 A1 * | 10/2012 | |

OTHER PUBLICATIONS

"OpenFlow (TM)—Enabled Hybrid Cloud 1-27 Services Connect Enterprise and Service Provider Data Centers", ONF Solution Brief, Nov. 13, 2012, pp. 1-9.

(Continued)

*Primary Examiner* — Benjamin M Thieu
(74) *Attorney, Agent, or Firm* — Patterson + Sheridan, LLP

(57) ABSTRACT

System, computer program product, and method to configure an external network based on internal network conditions, by monitoring a load attribute of one or more network flows traversing an ingress port of at least one network element in a software-defined networking (SDN) enabled network, upon determining that the load attribute of a first network element in the SDN enabled network exceeds a predefined threshold, provisioning, by the application, an additional service on the external network, by the application, an additional service on the external network, and extending, by the application, the SDN enabled network to include the additional service on the external network.

24 Claims, 6 Drawing Sheets

(56) References Cited

U.S. PATENT DOCUMENTS

2014/0075557 A1* 3/2014 Balabine et al. ............... 726/23
2014/0244851 A1* 8/2014 Lee ............................. 709/228

OTHER PUBLICATIONS

McDysan Verizon D: "Cloud Bursting Use Case; draft-mcdysan-sdnp-cloudbursting-usecase-0 0. txt", Cloud Bursting Use Case; Draft-McDysan-SDNP-Cloudbursting-Usecase-0 0.TXT, Internet Engineering Task Force, IETF; Standardworkingdraft, Internet Society (ISOC) 4, Rue Des Falaises CH-1205 Geneva, Switzerland, Oct. 24, 2011, pp. 1-8.

Jacobus Van Der Merwe et al: "Towards a ubiquitous cloud computing infrastructure", Local and Metropolitan Area Networks (LAN-MAN), 2010 17th IEEE Workshop on, IEEE, Piscataway, NJ, USA, May 5, 2010, pp. 1-6.

International Search Report for PCT/US2014/050571, Jun. 11, 2014.

* cited by examiner

AUTOMATIC CONFIGURATION OF EXTERNAL SERVICES BASED UPON NETWORK ACTIVITY

TECHNICAL FIELD

Embodiments presented in this disclosure generally relate to computer software. More specifically, embodiments disclosed herein relate to software executing on a network hardware which automatically configures external services based upon network activity.

BACKGROUND

It is frequently necessary to adapt to conditions in a third party network. It would be useful to be able to signal, configure, or programmatically interact with an external network as a result of internal network conditions. For example, it would be advantageous to extend a network to include external resources responsive to an increased load within the network.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION

Overview

Figure 1A:
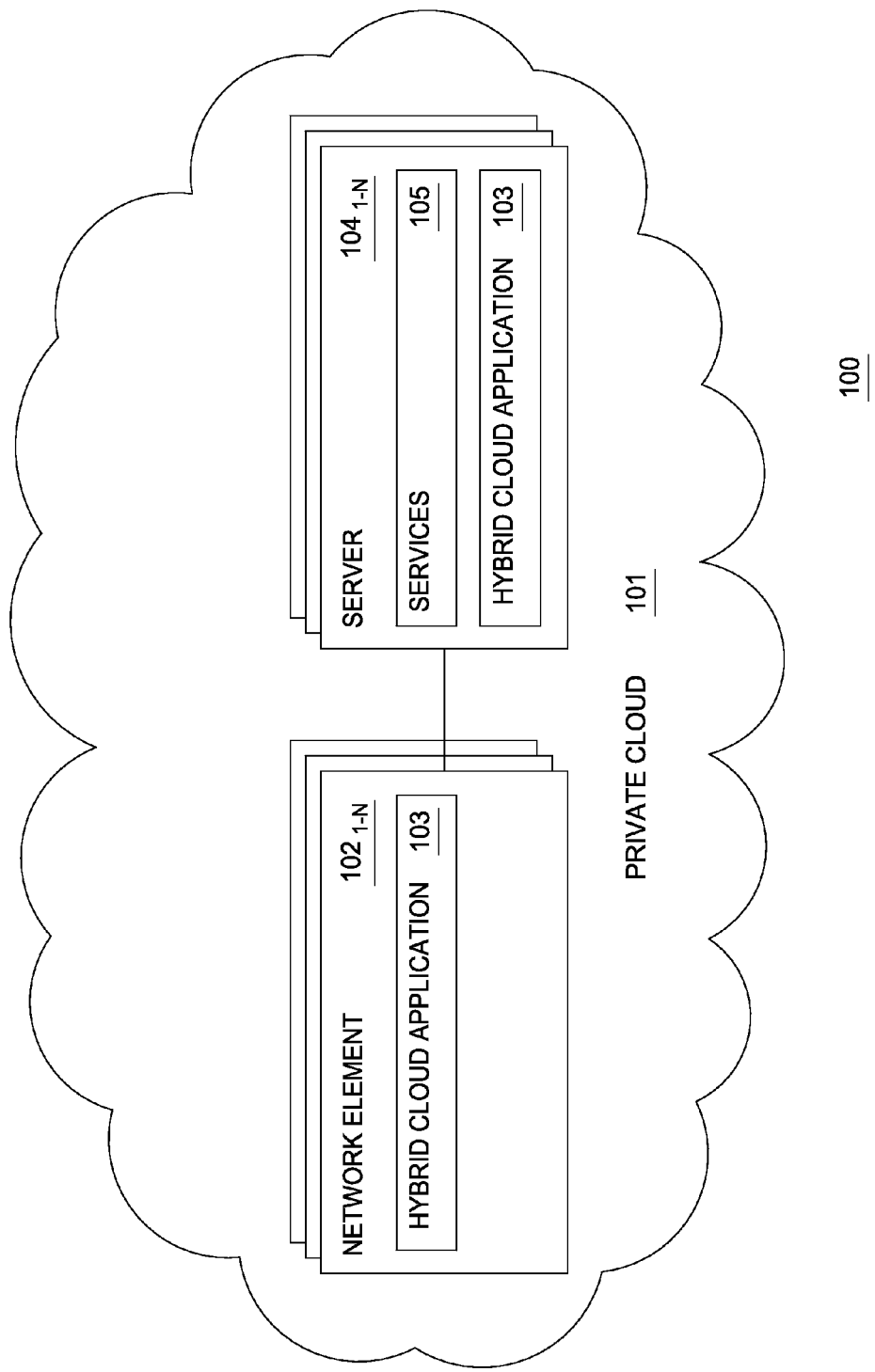
FIGS. 1A-1C illustrate automatic configuration of external services based upon network activity, according to one embodiment disclosed herein.

One embodiment of the invention includes a method to configure external networks based on internal network conditions. This method may generally include monitoring a load attribute of one or more network flows traversing an ingress port of at least one network element in a software-defined networking (SDN) enabled network. Upon determining that the load attribute of a first network element in the SDN enabled network exceeds a predefined threshold, the first network element issues a high load notification to an application executing on the network element. In response, the application provisions an additional service on an external network. Doing so extends the SDN enabled network to include the additional service on the external network.

DESCRIPTION OF EXAMPLE EMBODIMENTS

Embodiments disclosed herein provide a hybrid cloud controller in a software defined networking (SDN) enabled network that may run outside the context of a switch and make arbitrary decisions in response to detected network conditions or events. In one embodiment, the hybrid cloud controller provides a hybrid (private and public) cloud that is dynamically provisioned both at the application and network layers and configured in response to load. Upon detecting an increased load, for example, the hybrid cloud controller may extend a first network to include a third party network. Upon detecting a decrease in the load, the hybrid cloud controller may scale back the first network to remove the third party network.

Software defined networking (SDN) techniques allow a network, traditionally a static entity, to become more dynamic in nature. SDN opens networks to application developers, who may write applications to manage network elements and data flows passing through a network element, without requiring physical access to the network elements themselves. Thus, rather than a network element being a fixed-function "appliance," SDN considers network hardware to be part of a distributed computational system that can be manipulated by software. An application developer writing applications for an SDN may execute the application "in the network," which may include any device which processes data flows between computing systems, e.g., a switching or routing element connecting host systems to a network (and devices connecting one computing network to another), as well as other computing devices able to execute the application while connected to the network. The application may execute commands and apply functions to the network devices (and the data flows) remotely or locally on the network element itself. Using applications in an SDN, developers may manage networking functions of a network element, such as routing, quality of service (QoS), and bandwidth allocation, as well as manage performance and/or properties of the network elements themselves. Additionally, different programming logic may be applied to different flows or packets in the same network topology, such that each network graph need not have its own instance of the SDN application.

Software-defined networking (SDN), in general, provides additional flexibility and solidarity relative to conventional networks. Using an SDN controller, which may be either centrally located or located on the respective network devices, a network administrator can configure the control plane and dictate how the network devices route data. For example, the network administrator may assign criteria or SDN rules that, when satisfied, instruct the network device to perform a specific action on the received packet—e.g., drop the packet, forward the packet to a particular network device, evaluate the packet using an application on the network device, and the like. In one embodiment, the SDN controller configures the routing table or forwarding table (i.e., forwarding information base) in a network device based on the network administrator's preferences.

The descriptions of various embodiments below are presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access a hybrid cloud controller or related data available in the cloud. For example, the hybrid cloud controller could execute on a network element in a private cloud. An operator of a physical data center in the private cloud providing cloud services may use the hybrid cloud controller to monitor load for traffic generated by cloud customers (e.g., customers hosting virtual machine instances, networked by virtual networks) based on criteria relevant to the service provider. In such a case, the hybrid cloud controller could provision services in an external, public cloud, and extend the private cloud network to include services in the public cloud, creating a hybrid cloud configuration. The hybrid cloud controller may update the routing tables of the network elements in the private cloud to include the public cloud configuration. Doing so allows a user to access information saved in the cloud by the provisioned public cloud services from any computing system attached to a network connected to the cloud (e.g., the Internet).

Figure 1B:
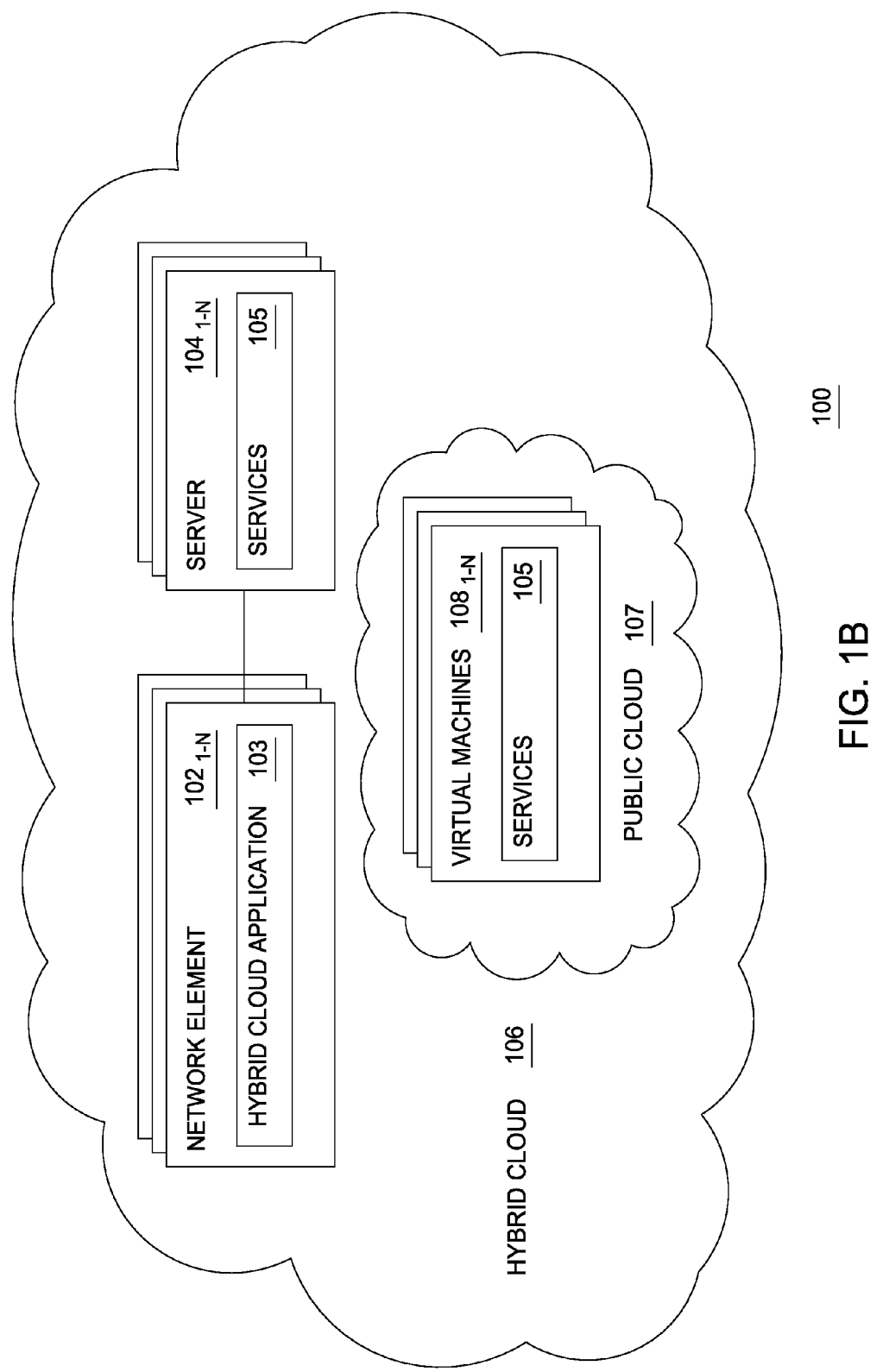
Figure 1C:
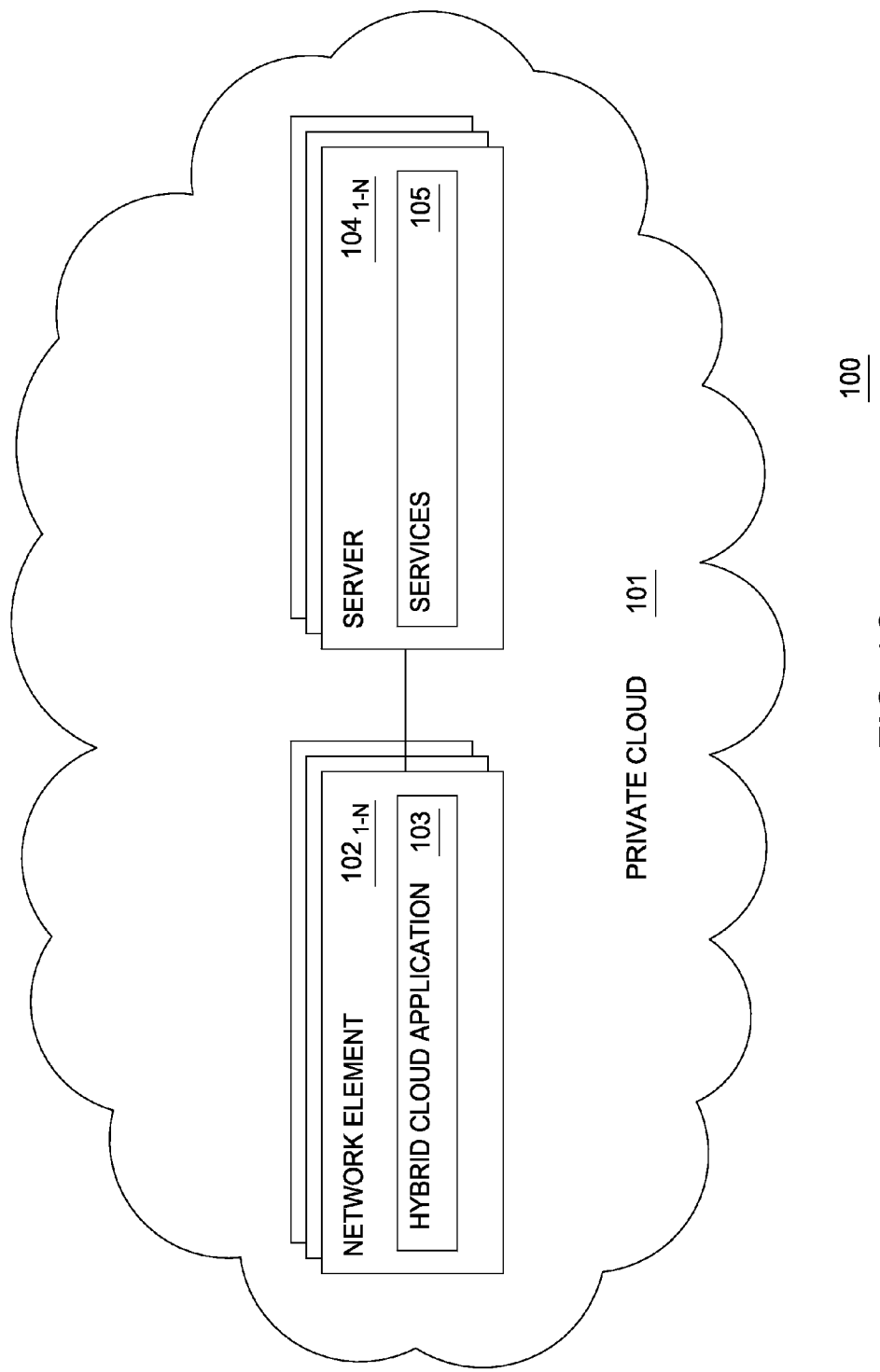

FIG. 1A illustrates a diagram 100 for automatic configuration of external services based upon network activity, according to one embodiment disclosed herein. Note generally that the embodiments depicted in FIGS. 1A-1C are for illustrative purposes only, and should not be considered limiting of the disclosure, as any arbitrary out-of-network actions are contemplated by the disclosure. As shown, a plurality of network elements $102_{1-N}$ and servers $104_{1-N}$ are communicably coupled in a private cloud computing environment 101, which may comprise a software defined networking (SDN) enabled network. The network elements $102_{1-N}$, in the private cloud 101 also support SDN, as they may be capable of executing containerized applications on their own processors (not shown). The network elements $102_{1-N}$ and servers $104_{1-N}$ may be physical or virtual, and may provide any type of cloud computing services 105 to end users. Even though one of the most touted abilities of cloud computing is the ability to scale up and back down in response to fluctuations in load, most enterprises have a "steady state" amount of processing that needs to occur in the private cloud 101. The hosting of this steady state processing may be handled more cheaply and effectively using dedicated machines, such as one or more of the servers $104_{1-N}$, rather than using fractionally rented machines.

The difficulty in such a scenario occurs when demand on these machines increases. In such an embodiment, an instance of a hybrid cloud application 103 may be created in the private cloud 101, and executed on one or more of the network elements $102_{1-N}$ (or servers $104_{1-N}$). The hybrid cloud application 103 may install a filter on the ingress port of each network element $102_{1-N}$ (or a selected subset thereof) and use a set of APIs residing on each network element $102_{1-N}$ to monitor events (attributes) correlated with load. In one embodiment, the input filter is a local monitoring agent configured to monitor the attributes correlated with load. Such attributes could include a count of a number of connections on the ingress port, an actual load of various connected processors, CPU capacity, dropped connections on the ingress port, or an observed latency of response in data flows traversing the network elements $102_{1-N}$. Generally, any attribute indicative of capacity or load of the network elements $102_{1-N}$ may be monitored. The load attribute may be monitored for a process on the network element, a virtual machine running within a network element, or a physical machine (such as the network element itself).

Once the filter detects that the values of the attributes being monitored exceeds a predefined threshold, it may issue a high load event. In one embodiment, the high load event may be pushed by the filter. In another embodiment, the high load event may be pushed by an instance of the hybrid cloud application 103 executing on the network element $102_{1-N}$. By pushing instead of polling, the amount of messaging in the system may be reduced. The hybrid cloud application 103, when receiving the high load event, may take actions to provision additional resources to alleviate the increased load within the private cloud 101. The hybrid cloud application 103 is not limited to configuration of the local network, it may also take arbitrary out of network actions, including but not limited to, provisioning external cloud services, as depicted in FIG. 1B. In another embodiment, a designated component of the network element $102_{1-N}$ experiencing the high load may receive the high load event and drive a request for more capacity.

FIG. 1B illustrates a diagram 100 for automatically configuring external services based upon network activity, according to one embodiment disclosed herein. FIG. 1B illustrates an embodiment where the hybrid cloud application 103 has determined that a load attribute value has exceeded a threshold, and has received the high load event notification. In response, the hybrid cloud application 103 has provisioned additional services 105 on a plurality of virtual machines $108_{1-N}$ that are provided by a public cloud provider 107. The hybrid cloud application 103 may also call external configuration tools to instantiate proper services 105 on the virtual machines $108_{1-N}$ of the public cloud 107. When the services 105 of the public cloud 107 are ready to take part of the load, the hybrid cloud application 103 dynamically extends the private cloud network 101 from FIG. 1A to include the virtual machines $108_{1-N}$, and alters the routes in the routing tables of the network elements $102_{1-N}$ to distribute traffic across the newly created hybrid cloud network 106. The hybrid cloud application 103 may alter the routes of the routing tables of the network elements $102_{1-N}$ using APIs, which reside on the network elements $102_{1-N}$, that abstract the underlying routing table and routing engine of the network elements $102_{1-N}$. By creating the hybrid cloud 106, the increased load may be handled more effectively and efficiently. Once the load decreases, the hybrid cloud application 103 may remove the additional services 105 and virtual machines $108_{1-N}$ from the private cloud 101, as described in greater detail in FIG. 1C.

FIG. 1C illustrates a diagram 100 for automatic configuration of external services based upon network activity, according to one embodiment. In this example, the hybrid cloud application 103 has determined, by monitoring the load attributes of the network elements $102_{1-N}$, that the increased load has subsided such that load levels are back to normal (i.e., the values of the load attributes have now returned below the threshold). In one embodiment, the hybrid cloud application 103 may decommission the external cloud virtual machines $108_{1-N}$ one by one and remove them from the load balancing pool until only the private cloud instances are left. Therefore, as shown, the diagram 100 illustrates the private cloud 101 which includes only the network elements $102_{1-N}$ and the servers $104_{1-N}$, as the hybrid cloud application 103 has removed all of the virtual machines $108_{1-N}$ of the public cloud 107 in response to the monitored load attribute returning below the threshold.

In one embodiment, one instance of the hybrid cloud application 103 executes within the private (or hybrid) cloud 101. Alternatively, the hybrid cloud application 103 may be distributed such that multiple instances of the hybrid cloud application 103 communicate. The hybrid cloud application 103 may be able to determine an optimal load/distribution based on additional specific attributes, including but not limited to temperature of a data center housing the private cloud 101, an electric grid load, an application response time, user identities, and other attributes that are not related to the network, but that can be used by the hybrid cloud application 103 to optimize and balance the load in the private cloud 101.

Figure 2:
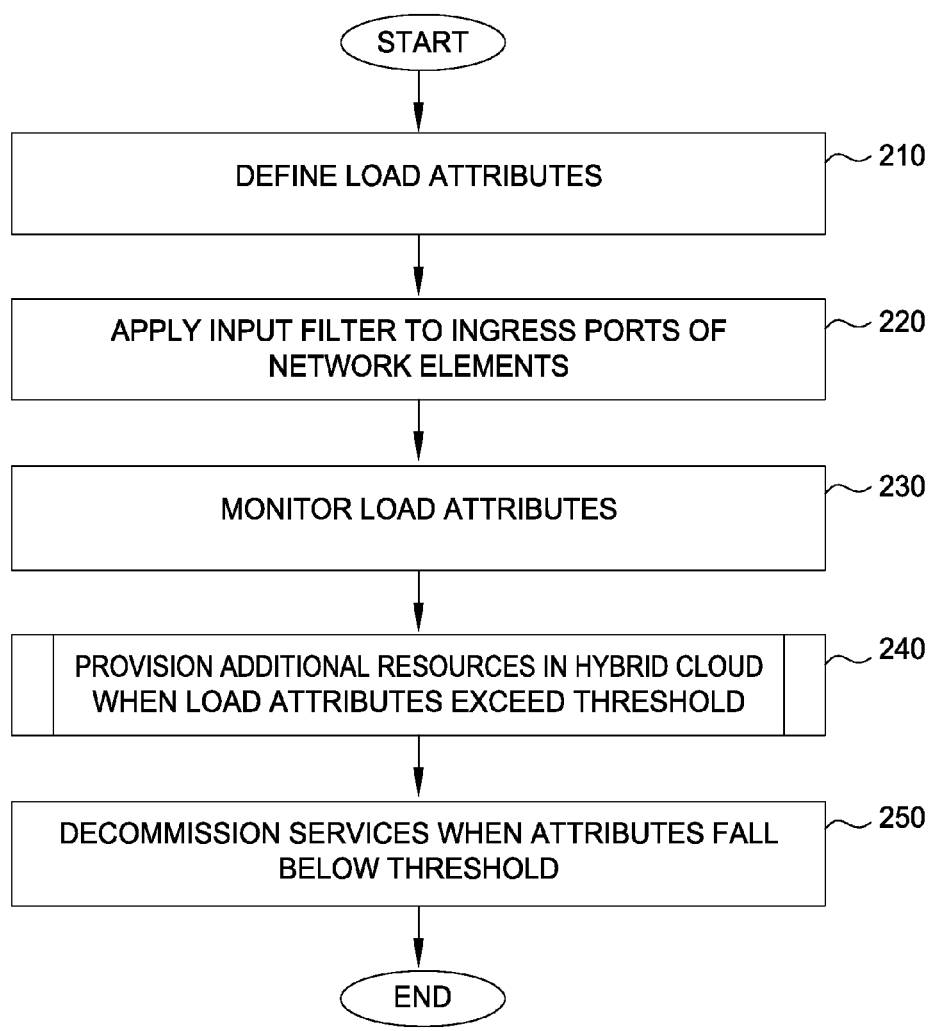
FIG. 2 illustrates a method for automatic configuration of external services based upon network activity, according to one embodiment disclosed herein.

FIG. 2 illustrates a method 200 for automatically configuring external services based upon network activity, according to one embodiment disclosed herein. Generally, the steps of the method 200 allow a hybrid controller to provision additional, external network services in response to a detected increase in load in a private cloud computing environment, i.e., an internal network. At step 210, load attributes are defined. The load attributes may include any attribute sufficient to reflect a current network load, including, but not limited to, counters on connections, load of connected processors, dropped connections, or latency. At step 220, an input filter is applied to the ingress ports of network elements in the network. In one embodiment, a filter is applied to each ingress port of each network element. In another embodiment, a strategically chosen subset of network elements (such as switches and gateways) are selected based on factors that include, but are not limited to the nature of the end user whose data uses the network elements (and their particular ingress ports), the types of applications transmitting data through the network elements, and properties of the network elements and their ingress ports (such as a network element having a one-way firewall on a particular ingress port).

At step 230, the load attributes are monitored by a controller, such as the hybrid cloud application 103, executing in the SDN enabled network. In one embodiment, the controller executes on one or more network elements in the SDN enabled network. In another embodiment, the controller may execute on a computer or blade server in the SDN enabled network. At step 240, described in greater detail with reference to FIG. 3, additional public cloud resources are provisioned to extend the network, and create a hybrid cloud when the load attributes exceed a predefined threshold. The threshold may be predefined, or set by a user. For example, the threshold may specify that no more than 100 connections may be established at a given time on a specific port. Once the threshold is exceeded, i.e., when more than 100 connections are established, the additional resources may be provisioned. At step 250, the additional services are decommissioned when the monitored load attributes fall below the threshold. In one embodiment, the additional services may be removed one by one as the load begins to drop, with the last additional service being removed once the load attributes fall below the threshold. In another embodiment, all services may be decommissioned only when the load falls below the threshold. Generally, any suitable method for decommissioning the additional services may be implemented.

Figure 3:
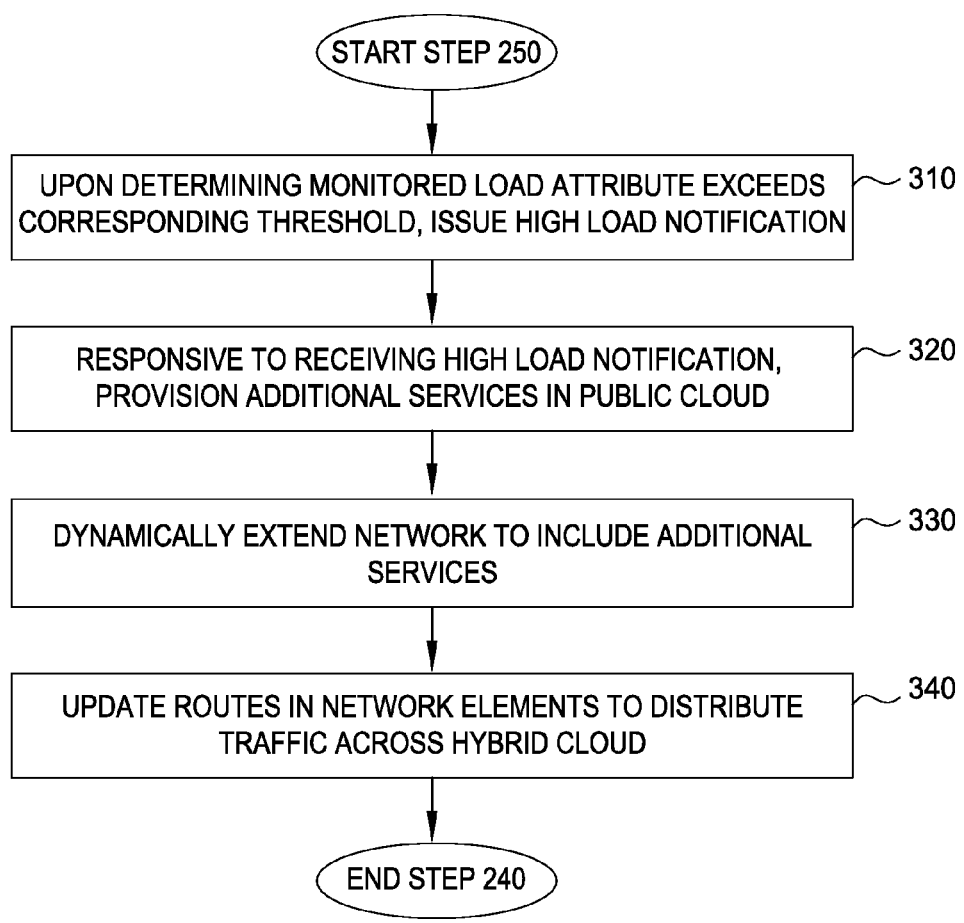
FIG. 3 illustrates a method for provisioning hybrid cloud resources based upon network activity, according to one embodiment disclosed herein.

FIG. 3 illustrates a method 300 corresponding to step 250 for provisioning hybrid cloud resources based upon network activity, according to one embodiment disclosed herein. Generally, execution of the steps of the method 300 results in configuration of a private cloud (local network), as well as arbitrary out-of-network actions, such as provisioning additional services from service providers outside of the private cloud. At step 310, a high load notification is issued upon determining that a monitored load attribute exceeds a corresponding threshold. For example, if a CPU utilization threshold is set at 90%, when the CPU utilization exceeds 90%, the high load notification is issued. At step 320, additional services in a public cloud are provisioned responsive to receiving the high load notification. In one embodiment, the additional network services may be provided on virtual machines sourced from a public cloud computing provider. Additionally, external configuration tools may be called to instantiate proper services on the public cloud virtual machines. At step 330, the local network is dynamically extended to include the additional services. This step may include altering routes in the routing tables of each network element in the private cloud to include the virtual machines in the public cloud, such that traffic may be distributed across the hybrid cloud (the newly formed cloud including the private cloud and the public cloud). Doing so allows the load in the private cloud to be alleviated by offloading some of the additional load to the public cloud services. Once the load returns to levels below the load threshold, the public cloud services may be decommissioned, leaving only the private cloud in its wake.

Figure 4:
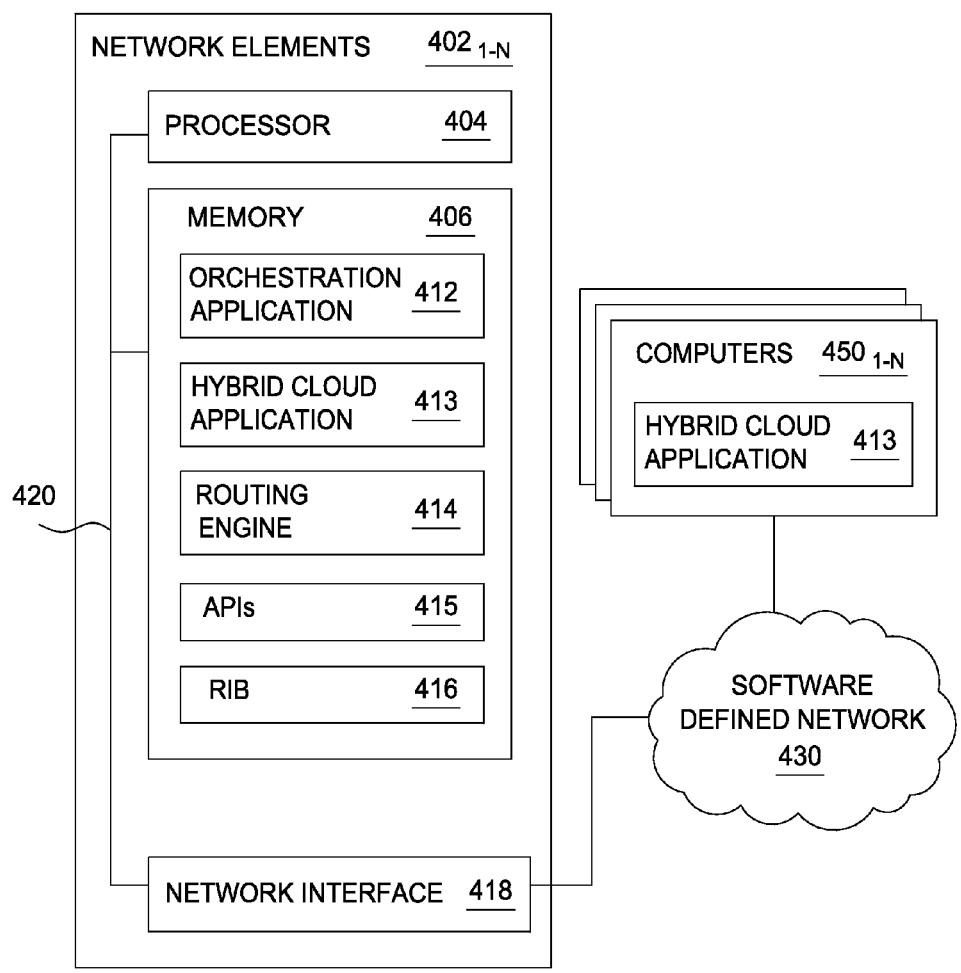
FIG. 4 illustrates a system for automatic configuration of external services based upon network activity, according to one embodiment disclosed herein.

FIG. 4 illustrates a system for automatically configuring external services based upon network activity, according to one embodiment. As shown, network elements $402_{1-N}$ are connected via a SDN enabled network 430. Computers $450_{1-N}$ are also connected to the network elements $402_{1-N}$ through the SDN enabled network 430. In general, the SDN enabled network 430 may be a telecommunications network and/or a wide area network (WAN). In a particular embodiment, the SDN enabled network 430 is the Internet.

Each network element $402_{1-N}$ has a processor 404 connected via a bus 420 to a memory 406, and a network interface device 418. The network elements $402_{1-N}$ are configured to execute containerized software applications. The network elements $402_{1-N}$ are generally under the control of an operating system (not shown). Examples of operating systems include the UNIX® operating system, distributions of the Linux® operating system, and the IOS operating system by Cisco Systems®. The processor 404 is included to be representative of a single CPU, multiple CPUs, a single CPU having multiple processing cores, and the like. The processor 404 may execute software developed for the purposes of embodiments disclosed herein. Similarly, the memory 406 may be a random access memory. While the memory 406 is shown as a single identity, it should be understood that the memory 406 may comprise a plurality of modules, and that the memory 406 may exist at multiple levels, from high speed registers and caches to lower speed but larger DRAM chips. The network interface device 418 may be any type of network communications device allowing the network elements $402_{1-N}$ to communicate with other network elements $402_{1-N}$ and computers $450_{1-N}$ via the SDN enabled network 430.

As shown, the memory 406 contains an orchestration application 412, which is an application generally configured to orchestrate automation and programmability of the network elements $402_{1-N}$ in the SDN enabled network 430. Generally, the orchestration application 412 provides a plurality of APIs used to abstract the implementation specific details of the network elements $402_{1-N}$ in the SDN enabled network 430. Stated differently, the APIs 415 of the orchestration application 412 are abstraction tools that permits a programmer or network administrator to access and monitor different functions and outputs of network elements $402_{1-N}$ in the SDN enabled network 430. By using the orchestration application 412 and the APIs 415, functional programming techniques may be used to program a wide range of network elements $402_{1-N}$, regardless of the wide array of distinctions found between specific network elements $402_{1-N}$. In particular, the orchestration application 412 may provide an interface to allow an application, such as the hybrid cloud application 413, to read, write and modify the routing table and routing engine 413 of a network element $402_{1-N}$.

The memory 406 also contains a hybrid cloud application 413 generally configured to monitor load attributes on ingress ports of the network elements $402_{1-N}$, and provision additional services external to the software defined network 430. For example, the hybrid cloud application 413 may determine that a dropped connection count on a particular ingress port has exceeded a dropped connection threshold. In response, the hybrid cloud application 413 may provision external services provided by a public cloud computing provider to help alleviate the increased load. The hybrid cloud application 413 may also call external configuration tools to instantiate the services in the public cloud. Once the external public cloud services have been instantiated, the hybrid cloud application 413 may alter the routes of the network elements $402_{1-N}$ such that traffic may traverse the hybrid cloud computing environment (the SDN enabled network 403 and the public cloud network). The hybrid cloud application 413 may use the APIs 415, provided by the orchestration application 412, to modify the RIB and routing engine 414 of the network elements $402_{1-N}$ to incorporate the public cloud services into the hybrid cloud computing environment. The routing engine 414 of the network elements $402_{1-N}$ is an application generally configured to execute the core networking functions of the respective network element. The routing engine may interact with the routing information base (RIB) 416, also referred to as a routing table, which specifies a plurality of rules used by the routing engine 414 to route packets received on an ingress port (not shown) of the network elements $402_{1-N}$ to a proper egress port (not shown) of the network elements $402_{1-N}$. In one embodiment, the RIB 416 of each respective network element $402_{1-N}$ includes immediate topology information of the software defined network 130, i.e., what other network elements a respective network element is connected to, and so on. In one embodiment, the hybrid cloud application 413 is a distributed application distributed across each of the network elements $402_{1-N}$.

As shown, the memory 406 also contains the application programming interfaces (APIs) 415, which stores the APIs provided by the orchestration application 412 to the hybrid cloud application 413. In one embodiment, the APIs 415 are an integrated component of the orchestration application 412 or the hybrid cloud application 413. The APIs 415 gather data associated with the different functions of the network elements $402_{1-N}$, such as statistics associated with the network element, routing tables, status of the network elements, topology information, errors, and the like. Moreover, APIs 415 may also permit a programmer or network administrator to control the functions of the network elements $402_{1-N}$ such as change settings in the forwarding engine, change the state of the network elements $402_{1-N}$, etc. An application, therefore, such as the hybrid cloud application 413 may use the APIs 415 to send commands to the network elements $402_{1-N}$.

By abstracting the RIB 416 of the network elements $402_{1-N}$ using the APIs 415, a network administrator may monitor and control a plurality of different types of network elements $402_{1-N}$ that each may use proprietary firmware, execute different networking application types, and provide different network operating systems. One such product that permits this function is the One Platform Kit (onePK) software development kit (SDK) by Cisco® (a registered trademark in the United States many other jurisdictions).

The computers $450_{1-N}$ may be capable of executing applications, such as the hybrid cloud application 413, which may utilize the functionality of the APIs 415 provided by the orchestration application 412. Therefore, in one embodiment, the orchestration application 412, the hybrid cloud application 413, and other user applications may be executed on one or more of the computers $450_{1-N}$ in order to modify the routing behavior (or any behavior) of the network elements $402_{1-N}$. In still another embodiment, the computers $450_{1-N}$ may be blade servers which execute the orchestration application 412 and the hybrid cloud application 413 in the SDN enabled network 430.

Advantageously, embodiments disclosed herein allow for the automated and programmatic extension of a network, including to a third party network. A hybrid cloud may use private resources for steady-state load and dynamically provision, configure, and integrate public cloud virtual machines into the service architecture in response to a detected increase in load.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer-implemented method, comprising:
    applying, by an application, an input filter to an ingress port of a first network element to monitor one or more network flows traversing the ingress port of the first network element using an application programming interface (API), the API abstracting a control plane of the first network element to permit the application to monitor and control data traffic traversing the first network element, wherein the first network element is in a software defined networking (SDN) enabled network, wherein the SDN enabled network comprises a private cloud network;
    monitoring, by the input filter, a load attribute of the one or more network flows;
    upon determining that the load attribute exceeds a predefined threshold, issuing, by the input filter applied to the first network element, a high load notification to the application;
    provisioning, by the application, an additional service on an external network, wherein the external network comprises a public cloud network, wherein the external network is external to and not a part of the SDN enabled network; and
    extending, by the application, the SDN enabled network to include the additional service on the external network, wherein extending the SDN enabled network creates a hybrid network comprising the private cloud network and the public cloud network.

2. The method of claim 1, wherein the load attribute comprises each of: (i) a number of connections of the ingress port of the first network element, (ii) a load of a processor of the first network element, (iii) a number of dropped connections of the ingress port of the first network element, and (iv) an observed response latency of the one or more data flows traversing the ingress port of the first network element.

3. The method of claim 2, wherein provisioning the additional service on the external network comprises:
    instantiating at least one virtual machine sourced from a public cloud computing provider; and
    calling external configuration tools to instantiate services on the at least one virtual machine.

4. The method of claim 3, wherein extending the SDN enabled network to include the additional service on the external network comprises:
    altering, by the application, a routing information base of the first network element to distribute traffic across the hybrid network.

5. The method of claim 4, further comprising:
    upon determining that the load attribute of the first network element falls below the threshold, decommissioning the additional service to remove the additional service from the SDN enabled network, wherein removing the additional service from the SDN enabled network removes the public cloud network from the SDN enabled network and converts the hybrid cloud network to the private cloud network.

6. The method of claim 5, wherein the application is executed on the first network element.

7. The method of claim =ON, wherein the application is a distributed application comprising a plurality of instances of the application executing on a respective one of a plurality of network elements in the SDN enabled network, wherein each of the plurality of instances are communicably coupled to determine an optimal load of the plurality of network elements based on each of: (i) a temperature of a data center housing at least a subset of the plurality of network elements, (ii) an electric grid load, (iii) a response time of a second application, a (iv) a client identifier.

8. The method of claim 7, wherein a plurality of network elements in the SDN enabled network each comprise a respective input filter and a respective API for monitoring load attributes of data traffic traversing the plurality of network devices.

9. A system, comprising:
one or more computer processors; and
a memory containing a program, which when executed by the one or more computer processors, performs an operation comprising:
applying, by an application, an input filter to an ingress port of a first network element in a software defined networking (SDN) enabled network to monitor one or more network flows traversing the ingress port of the first network element using an application programming interface (API), the API abstracting a control plane of the first network element to permit the application to monitor and control data traffic traversing the first network element:
monitoring, by the input filter, a load attribute of the one or more network flows;
upon determining that the load attribute exceeds a predefined threshold, issuing, by the input filter applied to the first network element, a high load notification to the application;
provisioning, by the application, an additional service on an external network, wherein the external network comprises a public cloud network and is external to and not a part of the SDN enabled network, wherein the SDN enabled network comprises a private cloud network; and
extending, by the application, the SDN enabled network to include the additional service on the external network, wherein extending the SDN enabled network creates a hybrid network comprising the SDN enabled network and the external network.

10. The system of claim 9, wherein the load attribute comprises each of: (i) a number of connections of the ingress port of the first network element, (ii) a load of a processor of the first network element, (iii) a number of dropped connections of the ingress port of the first network element, and (iv) an observed response latency of the one or more data flows traversing the ingress port of the first network element.

11. The system of claim 10, wherein provisioning the additional service on the external network comprises:
instantiating at least one virtual machine sourced from a public cloud computing provider; and
calling external configuration tools to instantiate services on the at least one virtual machine.

12. The system of claim 11, wherein extending the SDN enabled network to include the additional service on the external network comprises:
altering, by the application, a routing information base of the first network element to distribute traffic across the hybrid network.

13. The system of claim 12, the operation further comprising:
upon determining that the load attribute of the first network element falls below the threshold, decommissioning the additional service to remove the additional service from the SDN enabled network, wherein removing the additional service from the SDN enabled network removes the public cloud network from the SDN enabled network and converts the hybrid cloud network to the private cloud network.

14. The system of claim 13, wherein the application is executed on the first network element.

15. The system of claim 13, wherein the application is a distributed application comprising a plurality of instances of the application executing on a respective one of a plurality of network elements in the SDN enabled network, wherein each of the plurality of instances are communicably coupled to determine an optimal load of the plurality of network elements based on each of: (i) a temperature of a data center housing at least a subset of the plurality of network elements, (ii) an electric grid load, (iii) a response time of a second application, a (iv) a client identifier.

16. The system of claim 15, wherein a plurality of network elements in the SDN enabled network each comprise a respective input filter and a respective API for monitoring load attributes of data traffic traversing the plurality of network devices.

17. A computer program product to configure external networks based on internal network conditions, comprising:
a non-transitory computer-readable storage medium having computer-readable program code embedded therewith, the computer-readable program code executable by a processor to perform an operation comprising:
applying, by an application, an input filter to an ingress port of a first network element in a software defined networking (SDN) enabled network to monitor one or more network flows traversing the ingress port of the first network element using an application programming interface (API), the API abstracting a control plane of the first network element to permit the application to monitor and control data traffic traversing the first network element;
monitoring, by the input filter, a load attribute of the one or more network flows;
upon determining that the load attribute exceeds a predefined threshold, issuing, by the input filter applied to the first network element, a high load notification to the application;
provisioning, by the application, an additional service on an external network, wherein the external network comprises a public cloud network, wherein the external network is external to and not a part of the SDN enabled network; and
extending, by the application, the SDN enabled network to include the additional service on the external network, wherein extending the SDN enabled network creates a hybrid network comprising a private cloud network and the public cloud network, wherein the SDN enabled network comprises the private cloud network.

18. The computer program product of claim 17, wherein the load attribute comprises each of: (i) a number of connections of the ingress port of the first network element, (ii) a load of a processor of the first network element, (iii) a number of dropped connections of the ingress port of the first network element, and (iv) an observed response latency of the one or more data flows traversing the ingress port of the first network element.

19. The computer program product of claim 18, wherein provisioning the additional service on the external network comprises:
   instantiating at least one virtual machine sourced from a public cloud computing provider; and
   calling external configuration tools to instantiate services on the at least one virtual machine.

20. The computer program product of claim 19, wherein extending the SDN enabled network to include the additional service on the external network comprises:
   altering, by the application, a routing information base of the first network element to distribute traffic across the hybrid network.

21. The computer program product of claim 20, the operation further comprising:
   upon determining that the load attribute of the first network element falls below the threshold, decommissioning the additional service to remove the additional service from the SDN enabled network, wherein removing the additional service from the SDN enabled network removes the public cloud network from the SDN enabled network and converts the hybrid cloud network to the private cloud network.

22. The computer program product of claim 21, wherein the application is executed on the first network element.

23. The computer program product of claim 21, wherein the application is a distributed application comprising a plurality of instances of the application executing on a respective one of a plurality of network elements in the SDN enabled network, wherein each of the plurality of instances are communicably coupled to determine an optimal load of the plurality of network elements based on each of: (i) a temperature of a data center housing at least a subset of the plurality of network elements, (ii) an electric grid load, (iii) a response time of a second application, a (iv) a client identifier.

24. The computer program product of claim 23, wherein a plurality of network elements in the SDN enabled network each comprise a respective input filter and a respective API for monitoring load attributes of data traffic traversing the plurality of network devices.

* * * * *